3,219,453
DUCK FEEDS

Philip D. Bogdonoff, George W. Thrasher, and Jess N. Henson, Terre Haute, Ind., assignors to Commercial Solvents Corporation, New York, N.Y., a corporation of Maryland
No Drawing. Filed Aug. 4, 1961, Ser. No. 129,259
3 Claims. (Cl. 99—4)

Our invention relates to duck feeds and more particularly it relates to duck feeds containing propionic acid.

One trend in modern nutrition is toward the increased consumption of domestic fowl such as chickens and ducks. The proportion of chickens to ducks consumed has risen sharply due in part to the rapidly improving ability to produce chickens ready for market in much quicker time than is required to ready ducks.

We have now discovered that ducks fed small amounts of propionic acid will not only show increased rates of growth but will demonstrate improved feed conversion. Generally, we have found that duck feeds containing from about 0.1 to about 5% by weight of propionic acid based on the weight of the feed produce the desired results. However, optimum results are obtained when from about 0.5 to about 2% by weight of propionic acid is utilized. Thus, we generally add from about 0.9 to about 45.0 kilograms of propionic acid to each ton of feed. To prepare our feeds the additive is usually mixed first with a small amount of corn or soybean meal which is then blended into a larger portion of feed.

The following examples further illustrate our invention, but it is not intended that our invention be limited to the procedures, amounts of active ingredients, or described rations, but rather it is intended that all equivalents obvious to those skilled in the art be included within the scope of our invention.

EXAMPLE I 100 fifteen day old Pekin ducks were fed a pelleted feed containing the following:

| | | |
|---|---|---:|
| Ground yellow corn | lbs | 1468 |
| Ground oats | lbs | 60 |
| Soybean oil meal, 44% | lbs | 99 |
| Fish meal, 60% | lbs | 150 |
| Dried fish solubles | lbs | 10 |
| Dried whey | lbs | 40 |
| B·Y Basic [1] | lbs | 40 |
| Alfalfa meal, 17% | lbs | 50 |
| Dicalcium limestone | lbs | 30 |
| Ground limestone | lbs | 40 |
| $MnSO_4$, feed grade | lbs | 0.5 |
| CCC trace mineral [2] | lbs | 0.5 |
| Iodized salt | lbs | 5 |
| Vitamin A (10,000 u.) | gms | 272 |
| Vitamin $D_3$ (1,500 u.) | lbs | 4 |
| B·Y-21 [3] | lbs | 1 |
| Alpha-tocopherol acetate | gms | 7 |
| Niacin | gms | 40 |
| Menadione | gms | 0.5 |
| Proferm-6 [4] | lbs | 1 |
| Baciferm PB-10 [5] | lbs | 1 |

Calculated analysis

| | | |
|---|---|---:|
| Protein | percent | 15.0 |
| Fat | do | 3.6 |
| Fiber | do | 3.4 |
| Calcium | do | 1.63 |
| Phosphorus | do | 0.77 |
| Energy | cal./lb | 1000 |
| Riboflavin | mg./lb | 3.29 |
| Niacin | mg./lb | 32.1 |
| Pantothentic acid | mg./lb | 5.3 |
| Choline | mg./lb | 363 |
| Vitamin A | units/lb | 4594 |
| Vitamin $D_3$ | units/lb | 1361 |

[1] Commercial Solvents Corporation commercial fermentation residues containing unknown growth factors.

[2] Calcium Carbonate Company trace mineral mix having a guaranteed analysis of:

| | Percent |
|---|---:|
| Manganese, minimum | 12.20 |
| Iron, minimum | 9.60 |
| Calcium, maximum | 9.50 |
| Calcium, minimum | 7.50 |
| Copper, minimum | 0.73 |
| Zinc, minimum | 0.67 |
| Iodine, minimum | 0.38 |
| Cobalt, minimum | 0.26 |

[3] B·Y-21 is Commercial Solvents Corporation riboflavin feed supplement containing 8 mg. of riboflavin per gram of supplement.

[4] Proferm-6 is Commercial Solvents Corporation feed supplement containing 6 mg. of vitamin $B_{12}$ per pound of supplement.

[5] Baciferm PB-10 is Commercial Solvents Corporation feed supplement additive containing 7.5 grams of bacitracin per pound and 2.5 grams of procaine penicillin per pound.

At the end of 41 days, the ducks were weighed and sacrificed. The ducks had gained on an average of 7.53 pounds at the end of the test and had consumed 2.98 pounds of feed per pound of weight gain.

EXAMPLE II

The procedure of Example I was carried out except that 4.5 kilograms of propionic acid were added to the basal ration. At the end of the 41-day test period, the ducks had gained on the average of 7.93 pounds and had consumed 2.62 pounds of food for every pound of weight gained.

EXAMPLE III

The procedure of Example I was carried out except that 9.0 kilograms of propionic acid were added to the basal ration. At the end of the 41-day test period, the ducks had gained on an average of 7.93 pounds and had consumed 2.62 pound of food for every pound of weight gained.

Now having described our invention what we claim is:

1. A process for increasing the rate of growth of ducks, which comprises feeding said ducks a complete nutrient feed ration containing propionic acid in a small but effective amount to produce weight gain and improve feed conversion.

2. A process for increasing the rate of growth of ducks, which comprises feeding said ducks a complete nutrient feed containing from about 0.1 to about 5.0% by weight of propionic acid.

3. A process for increasing the rate of growth of ducks which comprises feeding said ducks a nutrient ration containing from about 0.5 to about 2.0% by weight of propionic acid.

References Cited by the Examiner

UNITED STATES PATENTS 2,946,722    7/1960    Hoffman et al.
2,965,488   12/1960    Belasco _____ 99—2

OTHER REFERENCES

Richardson et al.: Texas Agr. Expt. Sta., College Station, Bulletin No. 879, 1957, 6 pp.

A. LOUIS MONACELL, *Primary Examiner.*

WILLIAM B. KNIGHT, *Examiner.*